United States Patent
Ni et al.

(10) Patent No.: US 11,450,314 B2
(45) Date of Patent: Sep. 20, 2022

(54) VOICE USER INTERFACE SHORTCUTS FOR AN ASSISTANT APPLICATION

(71) Applicant: Google LLC, Mountain View, CA (US)

(72) Inventors: Yuzhao Ni, Sunnyvale, CA (US); Lucas Palmer, Windsor (CA)

(73) Assignee: GOOGLE LLC, Mountain View, CA (US)

( * ) Notice: Subject to any disclaimer, the term of this patent is extended or adjusted under 35 U.S.C. 154(b) by 134 days.

(21) Appl. No.: 15/785,100

(22) Filed: Oct. 16, 2017

(65) Prior Publication Data

US 2019/0103103 A1  Apr. 4, 2019

Related U.S. Application Data

(60) Provisional application No. 62/567,726, filed on Oct. 3, 2017.

(51) Int. Cl.
 *G10L 15/22* (2006.01)
 *G10L 15/30* (2013.01)
 *G10L 15/18* (2013.01)

(52) U.S. Cl.
 CPC .......... *G10L 15/22* (2013.01); *G10L 15/1822* (2013.01); *G10L 15/30* (2013.01); *G10L 2015/223* (2013.01)

(58) Field of Classification Search
 CPC ..... G10L 15/22; G10L 15/1822; G10L 15/30; G10L 2015/223
 USPC ....................................................... 704/257
 See application file for complete search history.

(56) References Cited

U.S. PATENT DOCUMENTS

| | | | |
|---|---|---|---|
| 8,275,617 B1 | 9/2012 | Morgan | |
| 8,453,058 B1 * | 5/2013 | Coccaro | G06Q 50/01 715/728 |
| 2002/0115476 A1 * | 8/2002 | Padawer | H04M 1/72403 455/566 |

(Continued)

FOREIGN PATENT DOCUMENTS

| | | |
|---|---|---|
| JP | 2001027540 | 1/2001 |
| JP | 2015141226 | 8/2015 |
| KR | 1020160100641 | 8/2016 |
| KR | 20160117403 | 10/2016 |
| KR | 1020160137948 | 12/2016 |

(Continued)

OTHER PUBLICATIONS

Japanese Patent Office; Office Action issue in Application No. 2019568382; 6 pages; dated May 31, 2021.

(Continued)

*Primary Examiner* — Richemond Dorvil
*Assistant Examiner* — Rodrigo A Chavez
(74) *Attorney, Agent, or Firm* — Middleton Reutlinger

(57) ABSTRACT

Methods, apparatus, systems, and computer-readable media are provided for using shortcut command phrases to operate an automated assistant. A user of the automated assistant can request that a shortcut command phrase be established for causing the automated assistant to perform a variety of different actions. In this way, the user does not necessarily have to provide an individual command for each action to be performed but, rather, can use a shortcut command phrase to cause the automated assistant to perform the actions. The shortcut command phrases can be used to control peripheral devices, IoT devices, applications, websites, and/or any other apparatuses or processes capable of being controlled through an automated assistant.

16 Claims, 6 Drawing Sheets

(56) References Cited

U.S. PATENT DOCUMENTS

| | | | | |
|---|---|---|---|---|
| 2009/0299751 | A1* | 12/2009 | Jung | G10L 15/26 901/50 |
| 2013/0275164 | A1* | 10/2013 | Gruber | G10L 15/22 705/5 |
| 2013/0338995 | A1* | 12/2013 | Elkins | G06F 9/451 704/2 |
| 2015/0053779 | A1 | 2/2015 | Adamek et al. | |
| 2016/0118048 | A1* | 4/2016 | Heide | G10L 15/22 704/275 |
| 2016/0240189 | A1* | 8/2016 | Lee | G10L 15/22 |
| 2017/0084273 | A1 | 3/2017 | Zohar et al. | |

FOREIGN PATENT DOCUMENTS

| | | |
|---|---|---|
| KR | 1020170096394 | 8/2017 |
| WO | 0138962 | 5/2001 |

OTHER PUBLICATIONS

The Korean Intellectual Property Office; Notice of Office Action issued in Application No. 10-2019-7038444; 13 pages; dated May 24, 2021.

European Patent Office; Invitation to Pay Additional Fees for Application No. PCT/US2018/054013; 15 pages; dated Jan. 2, 2019.

European Patent Office; Intention to Grant issued in Application No. 18792748.8, 7 pages; dated Oct. 13, 2020.

Japanese Patent Office; Office Action issue in Application No. 2019568382; 11 pages; dated Nov. 24, 2020.

European Patent Office; International Search Report and Written Opinion of PCT Ser. No. PCT/US2018/054013; 20 pages; dated Feb. 25, 2019.

Intellectual Property India; Office Action issued in Application No. 201927051105; 7 pages; dated Mar. 18, 2021.

European Patent Office; Communication pursuant to Article 94(3) EPC issued in Application No. 18792748.8, dated Apr. 3, 2020.

European Patent Office; Communication issued in Application No. 21158525.2; 7 pages; dated Jun. 1, 2021.

The Korean Intellectual Property Office; Notice of Allowance issued in Application No. 10-2019-7038444; 3 pages; dated Dec. 10, 2021.

Japanese Patent Office; Notice of Allowance issue in Application No. 2019568382; 3 pages; dated Nov. 8, 2021.

Korean Intellectual Property Office; Notice of Office Action issued in Application Ser. No. KR10-2022-7007687; 7 pages; dated May 22, 2022.

\* cited by examiner

VOICE USER INTERFACE SHORTCUTS FOR AN ASSISTANT APPLICATION

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may interact with automated assistants by providing commands using spoken natural language input (i.e., utterances) which may in some cases be converted into text and then processed, and/or by providing textual (e.g., typed) natural language input.

Typically, automated assistants are preconfigured with a variety of commands that, when provided as input to the automated assistant, each cause the automated assistant to perform a corresponding action. However, when provided with a command that is not preconfigured, automated assistants typically fail (e.g., present a default error message such as "I don't know how to do that"). Additionally or alternatively, to perform actions associated with multiple commands, the automated assistants typically require separate input for each of the multiple commands. For example, to cause the automated assistant to turn on networked lights and play music, a user must provide two separate inputs such as a first input of "turn on the lights" and second input of "play music". Further, in response to some commands, some automated assistants will always engage in further dialog with the user to resolve value(s) for slot(s) that are needed to perform the corresponding action. For example, in response to "turn on the lights", the automated assistant may always prompt the user "please specify which lights" to resolve values for a "light(s) identification" slot of a corresponding action.

SUMMARY

This disclosure relates to systems, methods, and apparatus for generating and/or utilizing shortcut commands for an automated assistant application. In some implementations, a user interacts with an automated assistant, through an automated assistant interface, to provide a shortcut command phrase for one or more pre-configured command phrases. The automated assistant can generate a storage entry that correlates the provided shortcut command phrases with the pre-configured command phrases and/or with action(s) that correspond to the pre-configured command phrases.

As one example, assume the automated assistant is pre-configured to be responsive to the command phrases "set my alarm" and "turn off the lights". Further assume that the assistant is not pre-configured to be responsive to the command phrase "nighty night". If a user provides, via an automated assistant interface, natural language (e.g., typed or spoken) input of "nighty night", the input (or a conversion thereof) can be provided to the assistant application and processed by the assistant application to determine that it is unrecognized (i.e., there is no particular action mapped to the phrase "nighty night"). Instead of presenting only a default message, such as "I don't know how to do that" in response to the unrecognized phrase, the automated assistant application may prompt (e.g., audibly and/or graphically) the user to "teach" the automated assistant one or more actions to perform in response to the unrecognized phrase. For example, the prompt can be "I don't know how to respond to that, but you can teach me. Tell me what you'd like me to do when you say nighty night". The user can then provide further natural language input of "set my phone alarm clock and turn off the lights." In response, the automated assistant application can create a storage entry that maps the phrase "nighty night" (and optionally variations thereof) to the recognized command phrases of "set my alarm clock" and "turn off the lights" and/or to the action associated with "set my phone alarm clock" and the action associated with "turn off the lights". When the user thereafter provides the phrase "nighty night", the automated assistant application can cause the actions associated with "set my phone alarm clock" and "turn off the lights" to be performed. In many implementations, the storage entry can be personal to the user, meaning that such actions will be performed in response to "nighty night" only in response to receiving "nighty night" from the user (e.g., at an automated assistant interface of a device of the user, or at a "shared" device and upon recognition of voice characteristics of the user).

In these and other manners, an improved automated assistant can be achieved through expansion of command phrase to which the automated assistant is responsive. Further, in these and other manners, network and/or computational resources can be reduced. For example, the shortcut command phrase can be shortened relative to the pre-configured command phrases that would otherwise be required to perform the associated actions. For instance, transmission of voice data when "nighty night" is spoken after being configured as a command phrase can consume less bandwidth than transmission of voice data when "set my phone alarm clock" and "turn off the lights" are both spoken. Further, computational burden in voice-to-text processing of the voice data and/or in other processing can be reduced.

In some implementations, an action that is mapped to a shortcut command phrase can have one or more slots whose values need to be resolved before the action can be performed by the automated assistant application. For example, the action associated with "set phone alarm clock" can have a slot for "alarm time" whose value needs to be resolved before the action can be performed. In some of those implementations, when the shortcut command phrase is being configured, the automated assistant application can prompt the user to define slot value(s) for those slot(s)—and optionally thereafter utilize those slot value(s) for the action(s) in response to receiving the shortcut command phrase. Continuing with the above example, when the user provides "set my phone alarm clock and turn off the lights", the automated assistant application can determine that the action mapped to "set my phone alarm clock" has a required slot value for the "alarm time" slot that was not specified by "set my phone alarm clock and turn off the lights". In response, the automated assistant application can provide a further prompt of "do you want to set a standard time for the alarm, or have me prompt you each time you say nighty night?". If the user responds to the prompt with a particular time (e.g., 8:00 AM), the automated assistant application can thereafter, in response to "nighty night" set the alarm clock of the user's phone for 8:00 AM, optionally without requiring any confirmation from the user. In these and other manners, an improved automated assistant can be achieved through mapping shortcut to command phrases to actions, and to particular slot value(s) for slot(s) of those actions. Further, in these and other manners, in response to receiving the shortcut command phrase, the slot value(s) can be automatically incorporated into the action and/or the action can be performed without requiring any further confirmation from the user, which can eliminate dialog turn(s) that would otherwise be required to provide the slot value(s) and/or confirm the action. Elimination of dialog turn(s) can conserve network and computational resources.

In some additional and/or alternative implementations, a shortcut command phrase can be configured in response to a single utterance that includes the shortcut command phrase and one or more pre-configured command phrases. For example, assume the automated assistant is pre-configured to be responsive to the command phrases "set my alarm" and "turn off the lights". Further assume that the assistant is not pre-configured to be responsive to the command phrase "nighty night". If a user provides, via an automated assistant interface, natural language (e.g., typed or spoken) input of "when I say nighty night, set my phone alarm clock and turn off the lights." In response, the automated assistant application can create a storage entry that maps the phrase "nighty night" (and optionally variations thereof) to the command phrases of "set my alarm clock" and "turn off the lights" and/or to the action associated with "set my phone alarm clock" and the action associated with "turn off the lights". When the user thereafter provides the phrase "nighty night", the automated assistant application can cause the actions associated with "set my phone alarm clock" and "turn off the lights" to be performed.

The above description is provided as an overview of some implementations of the disclosure. Additional description of those, and other, implementations is provided herein.

In some implementations, a method implemented by one or more processors is set forth as including steps such as receiving one or more command phrases at an automated assistant interface of a computing device. The one or more command phrases can be processed, as input data, by an automated assistant application that is accessible to the computing device. The steps can also include identifying, using the input data, one or more actions to be performed by the automated assistant application, and receiving a shortcut command phrase at the automated assistant interface. The shortcut command phrase can correspond to a request to cause the one or more actions to be performed by the automated assistant application in response to the shortcut command phrase. The steps can further include causing a prompt to be provided from the automated assistant application. The prompt can include a request for a slot value for an action of the one or more actions. Additionally, the steps can include receiving, in response to the prompt, a user input for fulfilling the slot value for the action, and generating a storage entry that provides a correlation between the shortcut command phrase, the slot value, and the one or more actions. Subsequent to generating the storage entry, the method can include receiving the shortcut command phrase at the automated assistant interface of the computing device, in response to receiving the shortcut command phrase, and, based on the storage entry providing the correlation between the shortcut command phrase, the slot value, and the one or more actions: performing, by the automated assistant application, the one or more actions with the slot value.

In some implementations, the automated assistant interface is an audio interface, and each command phrase of the one or more command phrases corresponds to one of a plurality of spoken commands previously provided by a user. At least one command phrase of the one or more command phrases can cause the automated assistant application to transmit an agent command to a separate computing device, and the agent command can include the slot value. The step of identifying the one or more command phrases can include comparing the input data to command phrase entries accessible to the automated assistant application to determine whether a portion of the input data is identified in the command phrase entries. The step of receiving the shortcut command phrase can include receiving multiple shortcut command phrases, and the method can further include identifying a total number of shortcut command phrases in the multiple shortcut command phrases, and comparing the total number of shortcut command phrases to a shortcut threshold. The method can further include, when the total number of shortcut command phrases is outside of the shortcut threshold, causing the automated assistant application to indicate that the total number of shortcut command phrases exceeds the shortcut threshold.

In other implementations, a system is set forth as including one or more processors, and memory configured to store instructions that, when executed by the one or more processors, cause the one or more processors to perform steps that include receiving a first command phrase provided by a user at an assistant interface. The assistant interface can be associated with an automated assistant application that is accessible to the one or more processors. The steps can also include determining that the first command phrase is unrecognized by the automated assistant application, at least based on an absence of correlation between the first command phrase and one or more command phrases available to the automated assistant application. The steps can further include causing a response phrase to be presented to the user via the assistant interface. The response phrase can include a request for instructions to execute the first command phrase. Additionally, the steps can include receiving one or more second command phrases in response to providing of the response phrase. The one or more second command phrases can identify one or more actions to be performed by the automated assistant application responsive to the first command phrase. Furthermore, the steps can include causing the automated assistant application to store a command phrase, corresponding to the first command phrase, in association with the one or more actions identified in the one or more second command phrases. The steps can also include, subsequent to causing the automated assistant application to store the command phrase, in association with the one or more actions identified in the one or more second command phrases: receiving, at the assistant interface or an additional assistant interface, input that corresponds to the command phrase, and in response to receiving the input that corresponds to the command phrase, and based on the command phrase being stored in association with the one or more actions: causing the one or more actions to be performed by the automated assistant application.

In some implementations, an action of the one or more actions includes invoking a third party agent application, which is hosted at a separate computing device, through transmission of an invocation request to the third party agent application. The steps can include identifying a slot value provided in one of the second command phrases, and incorporating the slot value in at least one of the one or more actions stored in association with the command phrase. Invoking the third party agent application can include incorporating the slot value in the invocation request transmitted to the third party agent application. The slot value can be incorporated in the invocation request based on the slot value being incorporated in the one or more actions stored in association with the command phrase. The slot value can be incorporated without prompting for any confirmation of the slot value in response to receiving the input that corresponds to the command phrase.

In some implementations, the steps can include receiving a third command phrase at the assistant interface. The third command phrase can be a spoken command that corresponds to the command phrase. The steps can also include causing the third command phrase to be converted to input data that is parsed by a speech processing application, and determining, from the input data, that the command phrase is identified in the third command phrase. The one or more actions can include transmitting a control signal to a peripheral device that is accessible to the one or more processors.

In yet other implementations, a non-transitory computer-readable medium is configured to store instructions that, when executed by one or more processors, cause the one or more processors to perform steps that include: receiving a command phrase at an assistant interface for an automated assistant application. The command phrase can correspond to a spoken command provided by a user of a computing device that includes the assistant interface. The steps can also include causing the automated assistant application to identify, from the command phrase, a shortcut command phrase and a supplemental command phrase. The supplemental command phrase can be a command invocation phrase that has not previously been received at the assistant interface. The steps can further include causing a storage entry to be generated that provides a correspondence between the shortcut command phrase and the supplemental command phrase; receiving, subsequent to the storage entry being generated, the shortcut command phrase at the assistant interface; and causing, in response to receiving the shortcut command phrase, the automated assistant application to perform one or more actions associated with the supplemental command phrase. The assistant interface can be an audio interface at the computing device, and the one or more action can include causing an audible output to be provided from the computing device. In some implementations, the steps can include causing an assistant teaching agent application to identify the storage entry and provide command data to the automated assistant application. The command data can identify the supplemental command phrase. The one or more actions can include providing a web query to a remote server that hosts a website. An action of providing the web query can correspond to the supplemental command phrase. The supplemental command phrase can identify a slot value to be included in the web query. Causing the storage entry to be generated can include invoking an assistant teaching agent that designates the shortcut command phrase as a trigger that causes the supplemental command phrase to be provided to the automated assistant application.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
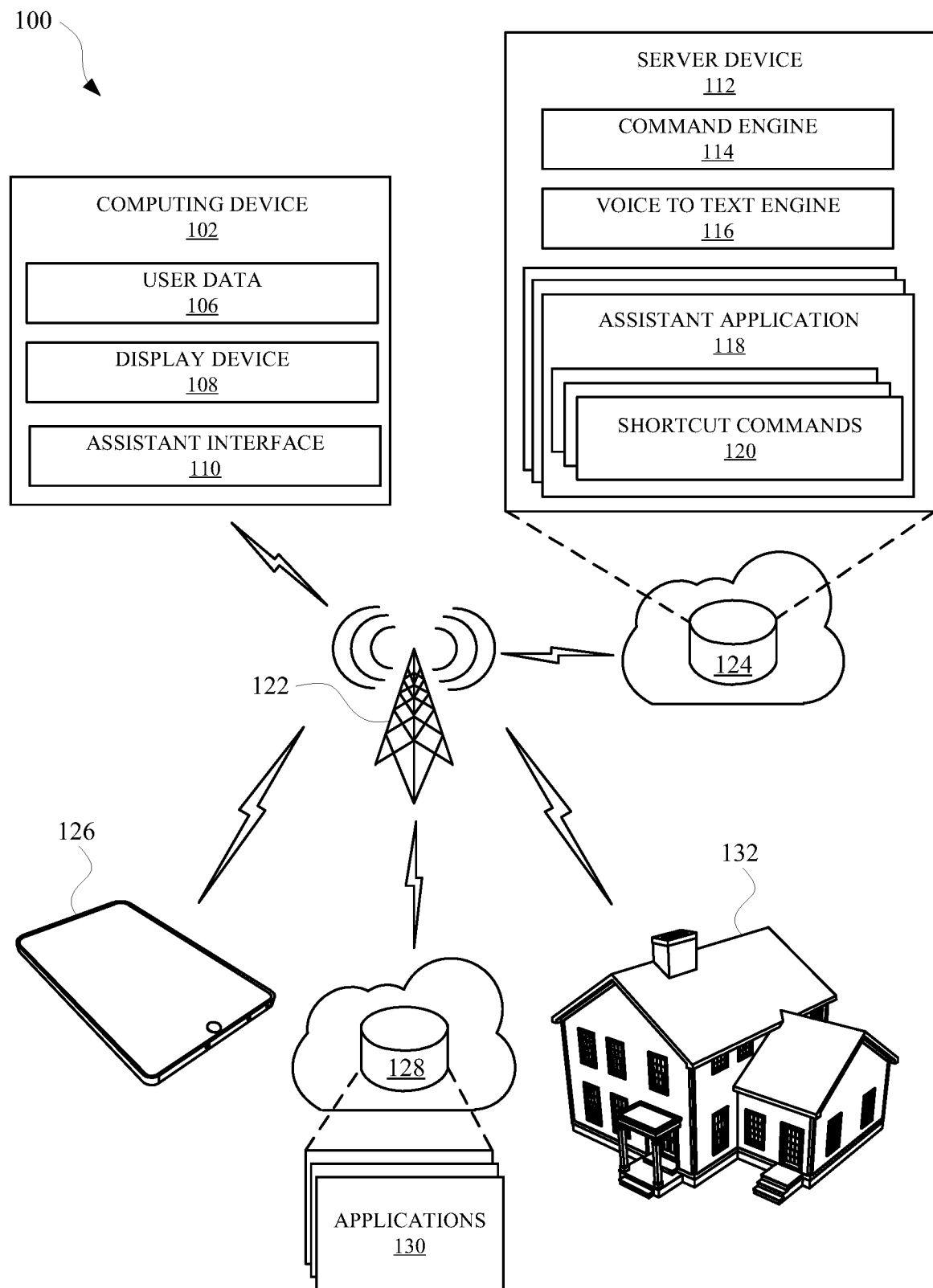
FIG. 1 illustrates a system for providing an automated assistant capable of being responsive to shortcut command phrases that can cause the automated assistant to perform multiple different actions.

Implementations set forth herein relate to systems, methods, and apparatus for enabling shortcut commands for an automated assistant. The shortcut commands can be command phrases that are spoken by a user to invoke multiple commands that are available through the automated assistant. For example, a user that operates a computing device can access an automated assistant through the computing device using a spoken command phrase. The command phrase can cause the automated assistant to perform particular actions specified by the user. A user can request the automated assistant perform a variety of different actions in response to a command phrase, and/or consolidate multiple command phrases into a single command phrase. For example, the automated assistant can map a new command phrase to multiple existing command phrases, so that the automated assistant can execute the actions associated with the existing command phrases in response to receiving the new command phrase. Alternatively, the new command phrase can be mapped to actions that are already correlated to the existing command phrases, in order that the automated assistant can perform the actions in response to receiving the new command phrase. In this way, the user does not need to recite each of the existing command phrases to cause the actions to be performed but, rather, can provide a single command phrase to cause the actions to be performed.

As an example, an existing invocation phrase can cause an automated assistant to perform a particular action. For instance, the invocation phrase "Play my party playlist" can cause the automated assistant to open a music streaming application for streaming music identified in a playlist accessible to the music streaming application. However, a user may desire to use a different phrase to accomplish the action(s) associated with the existing invocation phrase. For example, the user can request that the existing invocation phrase be processed when a distinct new invocation is provided. For instance, the new invocation phrase can be "party time" and can be mapped to the existing invocation phrase configured through a command such as, "Assistant, when I say 'party time,' play my party playlist." The command can invoke an assistant teaching agent or a shortcut assistant agent, which can be a separate assistant application or part of the automated assistant, and can map the new invocation phrase to the original invocation phrase. Thereafter, when the user provides the new invocation phrase, the mapping between the new invocation phrase and the original invocation phrase can be identified, and the original invocation phrase can be processed by the automated assistant. The automated assistant can then execute one or more actions corresponding to the original invocation phrase.

In some implementations, when the user is assigning a new invocation phrase to carry out functions associated with one or more existing invocation phrases, the automated assistant can query the user for additional details for performing particular actions. For instance, a user can have a history of providing invocation phrases to an automated assistant regarding ordering certain cleaning supplies. The invocation phrases can include, "Assistant, order paper towels," "Assistant, order bathroom cleaner," and "Assistant, order sponges." Subsequently, the user can create a shortcut or a new invocation phrase that will cause the automated assistant to perform the actions associated with the aforementioned invocation phrases. A command to create the new invocation phrase can be, for example, "Assistant, when I say 'order cleaning supplies,' order paper towels, bathroom cleaner, and sponges."

In response to the command, the automated assistant can perform a query to determine whether there are any configured invocation phrases corresponding to the command from the user. For instance, the automated assistant can cause a query to be performed at a database that includes settings for the automated assistant. The query can result in the identification of the previously configured invocation phrases and their corresponding actions. The automated assistant can perform further queries to enhance the responses to the previously configured invocation phrases. For example, ordering paper towels can involve the automated assistant interacting with a third party agent that is associated with a cleaning supplies entity. In response to receiving the command for configuring the new invocation phrase, the automated assistant can query the third party agent to identify slot values (e.g., brand, quantity, etc.) that the third party agent will accept as input. The automated assistant can then compile a response to the user for enhancing the specificity of the new invocation phrase. For instance, in response to the command to create the aforementioned invocation phrase (i.e., " . . . order cleaning supplies . . . "), the automated assistant can provide a response that solicits the user for more information. For instance the automated assistant can provide a response such as, "Ok, when I order paper towels, what brand and quantity would you like me to order?" In this way, the automated assistant can not only be versatile enough to be responsive to newly generated invocation phrases, but also be able to automatically enhance existing invocation phrases.

In some implementations, activity data (e.g., website activity, Internet of Things (IOT) device activity, physical activity data, etc.) can be used to enhance the actions to be performed in response to previously configured invocation phrases. For instance, the user may have previously configured the automated assistant to control their IOT (internet of things) devices in response to a particular invocation phrase such as, for example, "Assistant, turn off the lights." Subsequently, the user can direct the automated assistant to perform multiple actions according to a new invocation phrase, which can be established by a command from the user. For example, the command can be "Assistant, when I say 'goodnight' turn off the lights, turn off the music, and turn on the alarm." In response to the command, the automated assistant can scan for changes in the IOT devices. For instance, the user may have set up a new IOT device, such as an outdoor light that is WiFi enabled. The automated assistant can identify the outdoor light and solicit the user regarding whether the outdoor light should be associated with the new invocation phrase. For instance, the automated assistant can respond to the command with, for example, "Ok, would you like me to turn off the outdoor light when you say goodnight?" If the user replies yes, the new invocation phrase can be associated with the action of turning off the outdoor light as well as any other lights that were previously associated with the command to turn off the lights. In this way, the automated assistant can intuitively enhance the actions to be performed in response to a new invocation phrase, which acts as a shortcut for a previously configured invocation phrase. In some implementations, the previously configured invocation phrase (i.e., turn off the lights) can also be updated so that the action to be performed in response to the invocation phrase can include turning off the new outdoor light.

In some implementations, the user can create a shortcut for a configured invocation phrase that adds a condition or another slot value to the configured invocation phrase. For instance, the user may have previously configured the automated assistant to respond to the invocation phrase "Assistant, please order me movie tickets." In response, the automated assistant can guide the user through steps of ordering movie tickets. The steps can include: identifying a location to see a movie, identifying a movie that the user would like to see, identifying a time that the user is free, and providing a payment for the movie ticket. Subsequently, the user can provide a command for creating a new invocation phrase that causes the automated assistant to perform the actions associated with the configured invocation phrase, except with additional parameter(s) or condition(s) for executing the actions. For instance, the user can provide the command, "Assistant, when I say order me movie tickets, order me movie tickets for the most popular movie." The automated assistant can compare the new invocation phrase to the previously configured invocation phrase and determine differences between the two phrases. If a difference includes a new parameter or condition (e.g., "most popular"), the automated assistant can include the new parameter as a slot value in a function for executing any actions associated with the new invocation phrase. For example, a movie website can include an option for filtering movies according to popularity. In response to the new invocation phrase, the automated assistant can manipulate the filter to identify a most popular movie and continue ordering a ticket for the most popular movie according to the preconfigured actions of the automated assistant.

In some implementations, the automated assistant can receive an invocation phrase and compare the invocation phrase to similar phrases that can be associated with an action to be performed by the automated assistant. For instance, the automated assistant can receive an invocation phrase such as "Assistant, please play my recent song list." In response, the automated assistant can search for similar phrases that the user has previously provided. For example, the user may have previously provided the invocation phrase "Assistant, please play my recent playlist," in order to cause the automated assistant to play songs that are associated with a music application that is accessible to the automated assistant. When searching for similar phrases, the automated assistant can determine that the invocation phrase "play my recent song list" is similar to the previously received phrase of "play my recent playlist." In response to receiving the phrase "play my recent song list," the automated assistant can cause the music application to play a most recent playlist. Additionally, the automated assistant can store the invocation phrase "play my recent song list" in association with the action of playing the most recent playlist by the music application.

In some implementations, the automated assistant can receive an invocation phrase and determine that the automated assistant has not yet received the invocation phrase. In response, the automated assistant can provide a query to a user in order to determine exactly how to perform the action(s) that the user is requesting by providing the invocation phrase. For instance, the user can provide an invocation phrase such as "Assistant, get the house ready for a party." The automated assistant can search through a storage of invocation phrases in order to identify an exact match or a similar match to the provided invocation phrase. If a match is not identified, the automated assistant can reply with a query for the user, such as "I do not recognize that command. Could you teach me?" Thereafter, the user can provide a string of commands that set out the actions to be performed by the automated assistant in order to fulfill the request set forth in the invocation phrase. For instance, the user can provide the phrase to the automated assistant, "Sure, dim the lights and start playing my party playlist." In response, the automated assistant can identify the actions associated with the aforementioned phrase (e.g., dimming the lights and playing the party playlist) and generate a correlation between the actions and the initial invocation phrase (e.g., get the house ready for a party). Alternatively, the automated assistant can generate a correlation between the initial invocation phrase and the commands identified in the phrase explaining the initial invocation phrase, instead of the actions. In this way, instead of simply responding to an unfamiliar command with a generic error (e.g., "I'm sorry, I do not know how to do that yet"), the automated assistant can be responsive to unrecognized commands. Furthermore, the automated assistant can be responsive in a way that allows the automated assistant to learn new command phrases, thereby increasing the number of familiar commands received over time.

In some implementations, while setting up an automated assistant to perform particular actions, a user can request that a confirmation for one or more actions be omitted in order to expedite the completion of the actions. For instance, while ordering a particular menu item from a restaurant using the automated assistant, the automated assistant can provide a query response before executing the order in order to ensure that the order is correct. The query response can be preconfigured for particular orders through the automated assistant, or relayed from a restaurant agent application that requires the confirmation before the order is placed. In order to bypass a confirmation step of a particular interaction with an automated assistant, the user can request that the confirmation step be bypassed, or the automated assistant can query the user regarding whether to bypass the confirmation step. For instance, the user can have a history of requesting that the automated assistant order a pepperoni and onion pizza, with a soda and breadsticks, from a pizza company. The automated assistant can, in response, recite back the order for the user to subsequently verbally confirm the order. Thereafter, the user can request that a shortcut invocation phrase be created for the order from the pizza company such as, for example, "Assistant, when I say 'place my usual pizza order,' please order the pepperoni and onion pizza, with a soda and breadsticks, from the pizza company, without confirming the order." In response, the automated assistant can search for previous invocation phrases provided to the automated assistant to determine the actions that are associated with the previous invocation phrases. The determined actions can then be mapped to the invocation phrase "place my usual pizza order," and a setting associated with the invocation phrase can be established to not query the user to confirm the order, but rather proceed with the order without any subsequent confirmation from the user.

In some implementations, the automated assistant can be requested to convert a string of commands into a shortcut invocation phrase immediately after receiving the string of commands. For instance, the string of commands can include "Assistant, please turn off the lights in the house," "Assistant, please turn on the alarm system," and "Assistant, please set the temperature to 70 degrees." Momentarily after providing the string of commands, the user can cause the automated assistant to create a shortcut invocation phrase using a command such as, "Assistant, perform those action when I say 'I'm going to bed.'" In response, the automated assistant can correlate to the shortcut invocation phrase (e.g., "I'm going to bed") with the actions that were most recently requested through the string of commands. In this way, the next time the user provides the shortcut invocation phrase "I'm going to bed," the automated assistant can perform the actions of turning off the lights in the house, turning on the alarm system, and setting the temperature to 70 degrees.

The automated assistant is able to be responsive to new assistant shortcuts or new invocation phrases using a system that allows the shortcut invocation phrases to be mapped to existing invocation phrases and/or existing actions. For instance, a user can interact with the automated assistant through an automated assistant interface that is accessible through a computing device that is associated with the user. The computing device can include an assistant interface that can communicate verbal inputs from the user to an assistant server, which can host an automated assistant application. The assistant server can also include an assistant teaching agent, which can correspond to an application that interacts with an assistant teaching storage. The assistant teaching storage can include mappings of new shortcut invocation phrases to previously configured invocation phrases and/or previously configured actions for the previously configured invocation phrases. When a user provides a shortcut invocation phrase to the assistant interface, for example, through a verbal command, recorded audio can be transmitted to the assistant server for processing. The assistant server can then process the audio in order to identify the shortcut invocation phrase to which the audio corresponds. The assistant teaching agent can then identify, from the processed audio data, a mapping between the shortcut invocation phrase and an existing preconfigured invocation phrase or associated actions. The actions can then be performed by the automated assistant in response to the shortcut invocation phrase being received at the assistant interface.

Turning now to the figures, FIG. 1 illustrates a system 100 for providing an automated assistant capable of being responsive to shortcut command phrases that can cause the automated assistant to perform multiple different actions. The automated assistant can operate as part of an assistant application 118 that is provided at a computing device 102 or a remote device 124, such as a server device 112. A user can interact with the automated assistant via an assistant interface 110, which can be a microphone, a camera, a touch screen display, a user interface, and/or any other apparatus capable of providing an interface between a user and an application. For instance, a user can initialize the automated assistant by providing a verbal, textual, or a graphical input to the assistant interface 110 to cause the automated assistant to perform a function (e.g., provide data, control a peripheral device, access an agent, etc.). The computing device 102 can include a display device 108, which can be a display panel that includes a touch interface for receiving touch inputs and/or gestures for allowing a user to control applications of the computing device 102 via the touch interface. In other implementations, the computing device 102 can lack the display device 108 (e.g., provide audible user interface output, without providing graphical user interface output).

Although a single computing device 102 is illustrated in FIG. 1, in various implementations multiple computing devices can interface with the assistant application 118 in performing various techniques disclosed herein. For example, a shortcut command phrase can be provided to the assistant interface 110 of the computing device 102, and responsive data can be audibly and/or graphically presented at a separate computing device in response to the shortcut command phrase. The separate computing device can be linked to the computing device 102. For example, the separate computing device can be linked to the computing device 102 based on the same user account being utilized at both computing device, based on both computing devices being connected to the same secured network, based on both computing devices being in direct peer-to-peer communication with one another, etc. As another example, a storage entry correlating a shortcut command phrase to one or more actions can be generated through user interface input provided by a user utilizing the assistant interface 110 of the computing device 102 (through interaction with server device 112). Thereafter, the user can provide the shortcut command phrase at a separate computing device, and the storage entry accessed to perform the one or more actions in response. As yet another example, the shortcut command phrase can cause the assistant application 118 to transmit command(s) that cause the state of one or more peripheral devices (e.g., IoT devices) to be altered. For instance, a shortcut command phrase can cause a command to be transmitted to a networked "smart" light that causes the light to turn on or off, alter its lumen output, alter its light output color, etc. Also, for instance, a shortcut command phrase can additionally or alternatively be transmitted to a networked "smart" thermostat that causes it to alter a set temperature of a heating or cooling system of a home 132, turn a heating or cooling system on or off, etc. Also, for instance, a shortcut command phrase can additionally or alternatively be transmitted to a networked "smart" garage door opener at the home 132 that causes a garage door to open or close.

The computing device 102 can be in communication with the remote device 124 over a network 122, such as the internet. The computing device 102 can offload computational tasks to the server device 112 in order to conserve computational resources at the computing device 102. For instance, the server device 112 can host the assistant application 118 and the computing device 102 can transmit inputs received at the assistant interface 110 to the server device 112. However, in some implementations, the assistant application 118 can be hosted at the computing device 102. In various implementations, all or less than all aspects of the assistant application 118 can be implemented on the computing device 102. In some of those implementations, aspects of the assistant application 118 are implemented via a local assistant application of the computing device 102 and interface with the server device 112 that implements other aspects of the assistant application 118. The server device 112 can optionally serve a plurality of users and their associated assistant applications via multiple threads. In implementations where all or less than all aspects of the assistant application 118 are implemented via a local assistant application of the computing device 102, the local assistant application can be an application that is separate from an operating system of the computing device 102 (e.g., installed "on top" of the operating system)—or can alternatively be implemented directly by the operating system of the computing device 102 (e.g., considered an application of, but integral with, the operating system).

In some implementations, the server device 112 can include a voice to text engine 116 that can process audio data received at the assistant interface 110 to identify the text embodied in the audio data. The process for converting the audio data to text can include a speech recognition algorithm, which can employ neural networks and/or statistical models for identifying groups of audio data corresponding to words or phrases. The text converted from the audio data can be available to the assistant application 118 as textual data that can be used to generate and/or identify command phrases.

In some implementations, the server device 112 can operate a command engine 114 that manages a database of commands that are accessible to the assistant application 118. The database can include entries that correlate command phrases and actions. The command phrases can be speakable commands that, when spoken by a user to the assistant interface 110, can cause the assistant application 118 to perform one or more different actions. In some implementations, the command engine 114 can also modify the database to include shortcut command phrases, when requested by a user, and/or when otherwise tasked with creating a shortcut command phrase by a separate entity (e.g., a developer). For example, a user can typically request that the assistant application 118 play party music during a weekend evening using the command phrase "Play my party playlist." However, over time a user may desire to have the party music played in response to a different command phrase, such as "It's party time." In order to create a shortcut command phrase corresponding to the phrase "It's party time," the user can provide a command phrase such as "When I say 'it's party time,' then play my party playlist." The latter command phrase can be received at the assistant interface 110 and transmitted to the server device 112 for processing. The command engine 114 can use input data based on the command phrase to generate the shortcut command phrase for the user.

The command engine 114 can parse the input data to identify an intended shortcut command phrase (e.g., "it's party time"), a condition indicator (e.g., "then"), and the action(s) to be performed (e.g., "play my party playlist"). In some implementations, the assistant application 118 can receive the input data and cause the parsed portions of the input data to be compared to various database entries. For instance, the input data can be compared to preconfigured entries that identify a variety of condition indicators to distinguish between a portion of the input data that corresponds to the intended shortcut command phrase and the portion that corresponds to the action(s) to be performed. Such condition indicators can include "then," "could you," "please," etc. The assistant application 118 or the command engine 114 can also cause an entry to be generated for correlating the shortcut command phrase to the identified action. For example, an entry that identifies the shortcut command phrase "it's party time" can be correlated to the action of playing a party playlist. In this way, the user has created a condensed command phrase that can save the user time when providing a command, and save computational resources at the device hosting the assistant application 118.

In some implementations, the assistant application 118 can be responsive to multiple different shortcut commands 120, which can each be associated with multiple different actions. For instance, a user may typically use a variety of commands to prepare their home for having guests over for a movie night. The commands can include "Assistant, please open my movie application on my phone, order a pizza, and turn on the entertainment system." In response to the assistant application 118 receiving this command, the assistant application 118 can communicate over the network 122 with multiple different devices (e.g., cell phone 126) for carrying out actions corresponding to the command. The user can request that assistant application 118 consolidate the actions into a shortcut command phrase that is more condensed than the aforementioned command. For example, the user can request the assistant application 118 create the shortcut command phrase by providing the command, "Assistant, please perform those commands when I say 'get ready for movie night.'" In response, the assistant application 118 can identify the most recent string of commands, and/or the actions induced by the commands, and generate a database entry that correlates the actions to the shortcut command phrase "get ready for movie night." Thereafter, when the user provides the shortcut command phrase "get ready for movie night" to the assistant interface 110, the assistant application 118 can perform the actions without requiring the user to recite all of the previously recited commands.

In some implementations, when the user is configuring the assistant application 118 to operate according to a shortcut command phrase, assistant application 118 can provide feedback regarding an action to be performed in response to the shortcut command phrase. For instance, the shortcut command phrase "get ready for movie night," can cause the assistant application 118 to communicate with a third party agent associated with a website or application hosted by a remote device 128, such as a server or other computing device. The assistant application 118 can communicate with the third party agent using command phrases or coded functions that include slot values for completing orders through the third party agent. For instance, an action to be performed by the assistant application 118 in response to receiving the shortcut command phrase "get ready for movie night" can be to order a pizza. Therefore, slot values to complete the order can correspond to a size of the pizza and/or toppings for the pizza. When the user is configuring the assistant application 118 to operate according to the shortcut command phrase, the assistant application 118 can request that the user provide certain slot values. In this way, the assistant application 118 will use those slot values the next time the user provides the shortcut command phrase.

In some implementations, the user can request that the assistant application 118 use certain slot value and/or provide a follow up inquiry regarding a particular slot value. For example, the user can provide the command, "Assistant, when I say 'get ready for movie night,' you should open my movie application on my phone, order a pizza, and turn on the entertainment system." In response, the assistant application 118 can identify the slots necessary to fulfill the command "order a pizza," and provide a feedback response to the user. The feedback response can be, for example, "Ok, when I order the pizza, what size pizza and what toppings would you like?" Thereafter, the user can either request that the assistant application 118 always provide the same order (e.g., "Always order a large pizza with pepperonis."), or always inquire about some of the slot values (e.g., "Always order a large pizza but ask me about the toppings each time."). Thereafter, should the user elect to have the assistant application 118 always inquire about one or more of the slot values, the assistant application 118 can prompt the user for those slot values in response to the command phrase, while auto-populating other slot values that were specified by the user. For example, when the user subsequently provides the shortcut command phrase "get ready for movie night," the assistant application 118 can open the movie application, turn on the entertainment system, and ask the user what toppings they would like on the pizza (but auto-populate the specified "large" slot value for a "pizza size" slot). In this way, the user is able to provide a shortened command phrase ("get ready for movie night"), and in response the assistant application 118 automatically performs a plurality of actions (transmits a command to open the movie application and transmits a command to turn on the entertainment system) and auto-populates a slot value ("large") for a slot for another command. The auto-population of the slot value eliminates the need for a dialog turn to resolve that slot value, thereby conserving network resources and/or computational resources (e.g., the computational resources of the device that is hosting the assistant application 118). Furthermore, processing and acting upon the shortened command phrase reduces the amount of speech to text processing and/or reduces the user of other computational resources.

Figure 2:
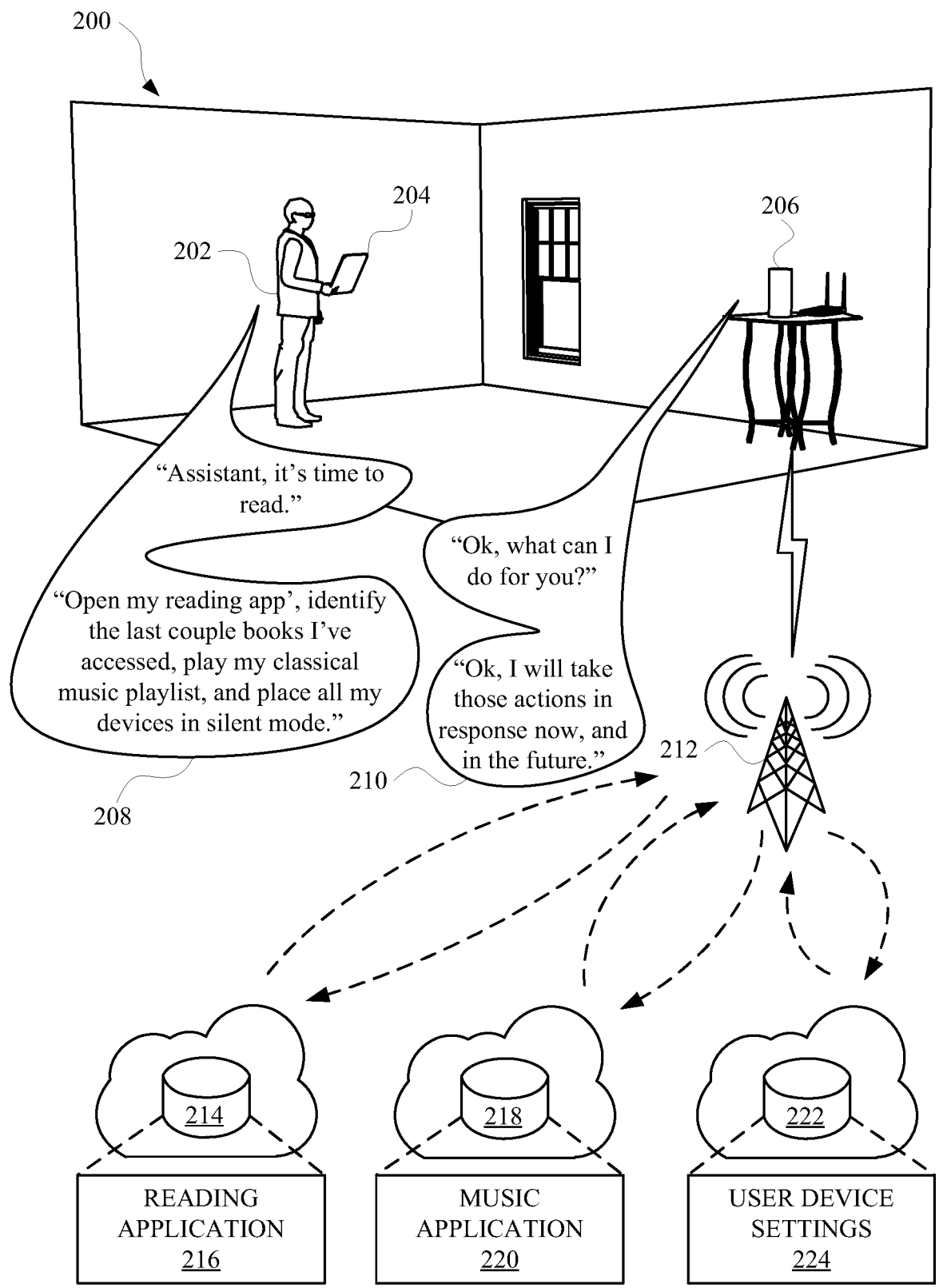
FIG. 2 illustrates a diagram that provides an example of a user establishing a shortcut command phrase with an automated assistant application.

FIG. 2 illustrates a diagram 200 that provides an example of a user 202 establishing a shortcut command phrase with an automated assistant application that is accessible through a computing device 206. The user 202 can provide dialog 208 to the computing device 206 for controlling the automated assistant application, and the automated assistant application can provide responses 210 to the user 202 in response to the dialog 208. In some implementations, the user 202 can invoke the automated assistant application to perform a variety of different actions when the user 202 recites individual commands. However, in order to consolidate the commands into a shortcut command phrase, the user 202 can cause the automated assistant application to be responsive to the shortcut command phrase by first providing the shortcut command phrase. This initial dialog 208 by the user 202 can cause the automated assistant application to inquire whether the user would like to setup a shortcut command phrase to use in the future.

For example, the user 202 can provide the dialog 208 "Assistant, it's time to read." In response, the automated assistant application can check a database or other data storage to determine whether the dialog 208 had been received before, or whether the automated assistant application can otherwise respond to the dialog 208. If the dialog 208 had not been received before, the automated assistant application can cause the computing device 206 to provide a response 210 such as "Ok, what can I do for you?" In this way, the automated assistant application can encourage the user 202 to explain how the user 202 would like the automated assistant application to respond to the initial dialog 208.

In some implementations, the automated assistant application can operate according to multiple different rules to ensure that responses 210 are effective in encouraging the user 202 to create a shortcut command phrase. For instance, the automated assistant application can determine, that the user 202 has identified a trigger and an action before generating an entry that identifies a new shortcut command phrase. For example, if the user 202 responds to the automated assistant application with "I would like you to . . . ," and thereafter does not say anything for a reasonable amount of time (e.g., one minute), the automated assistant application can respond with an error message such as "Sorry, I cannot create a shortcut command phrase without additional information." In this way, the automated assistant application is not creating shortcut command phrases that do not correspond to any actions.

In some implementations, the automated assistant application can check to see if the shortcut command phrase has already been created. If the shortcut command phrase has already been created, the automated assistant application can provide an error message such as "I've already created that shortcut command phrase, would you like to amend it?" In response, the user 202 can confirm that they would like to amend the shortcut command phrase to cause the automated assistant application to perform more, less, and/or different actions. However, if the automated assistant application has not already created the shortcut command phrase, the automated assistant application can continue to query the user 202 regarding what actions to take in response to the shortcut command phrase.

The user 202 can respond to the automated assistant application's query of "Ok, what can I do for you?" with additional dialog 208 that identifies actions to take to execute the shortcut command phrase. For instance, the additional dialog 208 can include "Open my reading app', identify the latest couple books I've accessed, and place all my devices in silent mode." In response, the automated assistant can perform the actions identified and also generate an entry in a database that correlates the actions to the shortcut command phrase of "it's time to read." The actions to be performed by the automated assistant can include accessing, over a network 212, a reading application 216 that is hosted by a remote device 214. Providing the shortcut command phrase can cause the automated assistant to provide user login data to the reading application 216 in order that the latest viewed books can be identified and announced back to the user 202. The automated assistant can thereafter perform an action of providing a response that identifies the latest viewed books (e.g., "You last opened 'Catcher in the Rye' and '6 Easy Pieces.'").

Additional actions that can be correlated to the shortcut command phrase can include causing the automated assistant to access a music application 220 hosted by a remote device 218, and causing the music application 220 to play a classical music playlist. The classical music playlist can be identified using data provided by the automated assistant to the music application 220. For instance, the automated assistant can provide text from dialog 208 to the music application 220 or an agent module associated with the music application 220 in order that the classical playlist can be identified. Furthermore, the actions can also include causing the automated assistant to access user device settings 224 stored at a remote device 222. The user device settings 224 can correspond a controls application for interacting with various devices associated with the user 202. In some implementations, because the user 202 requested that all devices be put into a "silent mode," the automated assistant can, in response, search the user device settings 224 for devices that are associated with or can otherwise operate in a silent mode.

The resulting devices can then be identified and identifiers for the devices can be stored in association with the shortcut command phrase. In this way, the next time the user 202 provides the shortcut command phrase, the identified devices can be converted from their current operating modes to a silent operating mode. In some implementations, if a new device has been associated with the user 202, the automated assistant can identify the new device through a background process for updating shortcut command phrases. If the new device includes a silent mode, for example, the new device can also be included with the devices that are switched to a silent mode when the user 202 provides the shortcut command phrase "It's time to read." In other implementations, the automated assistant can query the user 202 about the new device the next time the user 202 provides the shortcut command phrase. For instance, the automated assistant application can respond to the shortcut command phrase with "Ok, I've identified your new cell phone as having a silent mode. Would you like your new cell phone to also be turned to silent mode?" If the user 202 responds positively (e.g., "Yes."), the automated assistant application can modify or add an entry that identifies the new cell phone as being a device that should also be turned to a silent mode when the user 202 says "It's time to read."

In some implementations, the shortcut command phrase can be provided in a separate language than a primary language of the automated assistant application. For instance, the user 202 can request that a shortcut command phrase, "il est temps de lire" cause the automated assistant to perform that actions identified in the dialog 208. Although French may not be the primary language of the particular automated assistant application, the automated assistant application can store an entry that correlates the French shortcut command phrase to the actions in the dialog 208 for future use.

Figure 3:
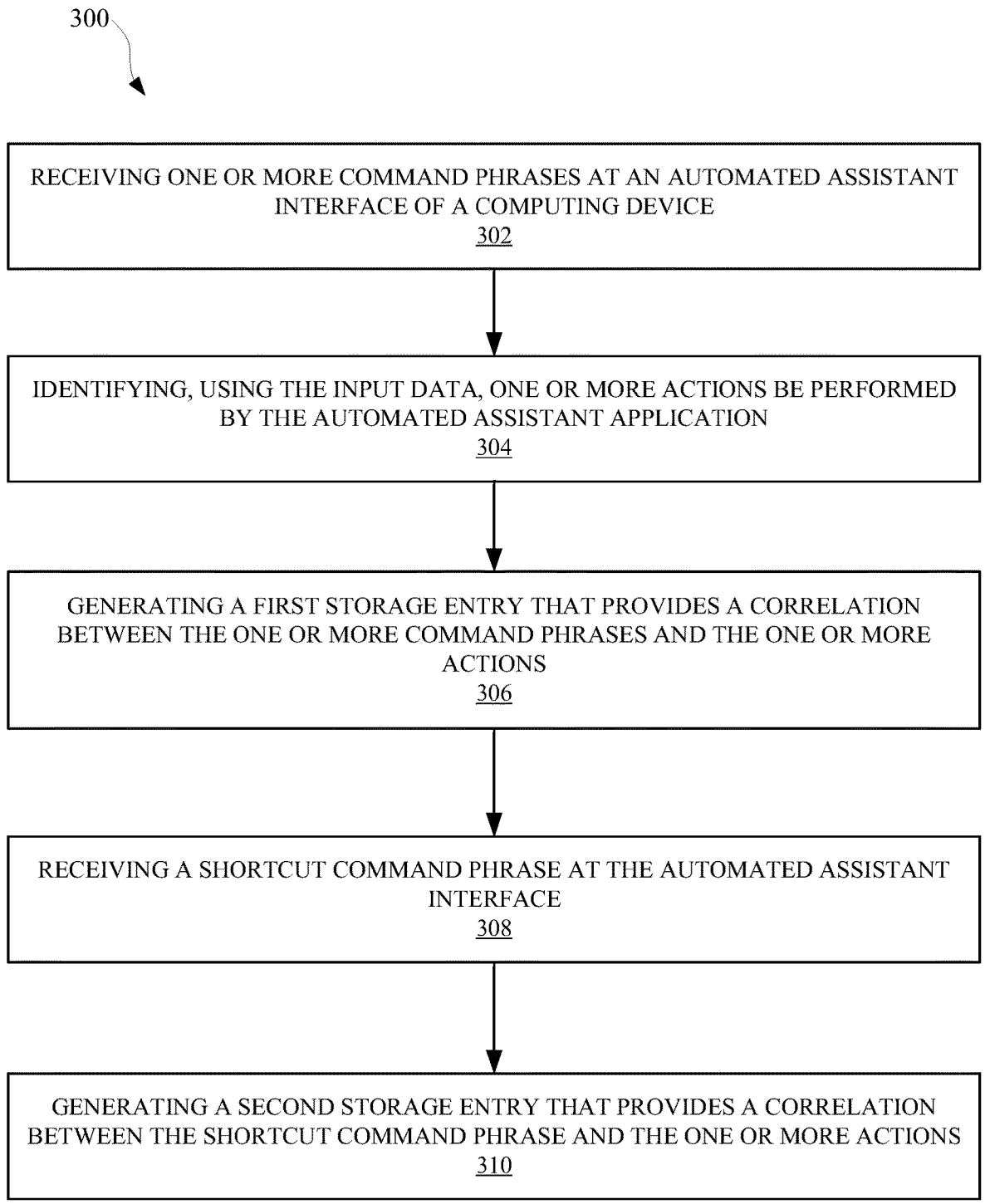
FIG. 3 illustrates a method for making a shortcut command phrase available for controlling an automated assistant.

FIG. 3 illustrates a method 300 for making a shortcut command phrase available for controlling an automated assistant. The method 300 can be performed by one or more computing devices, and/or any other apparatus capable of interacting with an automated assistant application. The method 300 can include a block 302 of receiving one or more command phrases at an automated assistant interface of a computing device. The one or more command phrases can be provided at different times, in order to cause an automated assistant to perform one or more different actions. The command phrases can be processed, as input data, by an automated assistant application that is accessible to the computing device. For instance, the computing device can include the automated assistant interface, which can collect inputs from a user, and the computing device can provide the inputs to a separate device, such as a server device that hosts the automated assistant application.

The method 300 can further include a block 304 of identifying, using the input data, one or more actions to be performed by the automated assistant application. The actions can be functions or operations that the automated assistant application is capable of directly or indirectly executing. Such actions can include performing a search query using a search application accessible to the automated assistant application. The actions can additionally or alternatively include controlling a peripheral device (e.g., a device connected to the computing device and/or the assistant application over a home WiFi network), a separate application (e.g., a call application, a calendar application, etc.), and/or any other software or hardware that can be controlled by a computing device. The actions can be preconfigured by an entity that created the automated assistant application, configured by a user of the automated assistant application, and/or setup by a third party that has been permitted to access the automated assistant application. In some implementations, the actions can additionally or alternatively include controlling a third party agent that is associated with a separate application, website, device, and/or any other entity capable of providing a third party service.

The method 300 can also include a block 306 of generating a first storage entry that provides a correlation between the one or more command phrases and the one or more actions. The storage entry can be generated at a server device that hosts the automated assistant application, or a separate device that is accessible to the automated assistant application. In some implementations, the storage entry can be provided as an entry in a table or database that identifies the one or more command phrases and the one or more actions. As a user continues to invoke the automated assistant using different command phrases, new storage entries can be generated in order that the automated assistant can be adapted to better serve the user. For instance, a user may typically use the command phrase "Play my workout playlist" to cause the automated assistant to play a workout playlist managed by a music application. However, the user may also use the command phrase "Start my workout playlist," which can also cause the automated assistant to play the workout playlist. Each of the command phrases ("play my workout playlist" and "start my workout playlist") can be incorporated into a command database with entries that correlate the command phrases to an action of playing the workout playlist. In other words, over time multiple command phrases can be correlated to the same action so the user does not necessarily have to provide the same command phrase to cause a particular action to be performed.

The method 300 can also include a block 308 of receiving a shortcut command phrase at the automated assistant interface. The shortcut command phrase can correspond to a request to cause the one or more actions to be performed in response to the shortcut command phrase. In other words, a user can verbally provide a request to the automated assistant interface for creating a shortcut command phrase that will invoke the automated assistant application to perform the one or more actions. For instance, a user can have a history of sequentially providing three command phrases to the automated assistant before going on a long run outside their home. The three command phrases can include "play a workout playlist," "turn on a security alarm," and "temporarily lower the heat in my house." In response, the automated assistant can initialize a music application on a user's portable device to play the workout playlist, cause their security alarm to initialize, and cause their thermostat to be set to a lower temperature to save energy while they are outside. However, over time the user may wish to consolidate those actions into a single shortcut command phrase, instead of having to provide the three aforementioned command phrases. In order to consolidate the performance of the actions into a single shortcut command phrase, the user can provide the request to the automated assistant interface. For example, the request can be "Assistant, when I say I'm going for a run, please play the workout playlist, turn on the security alarm, and temporarily lower the heat in the house." The command phrases and the shortcut command phrase can be identified in the request at least based on the condition (e.g., "when I say") that separates the command phrases from the shortcut command phrase. For instance, the request can be a verbal command that is processed by a voice to text engine to generate text that is subsequently parsed and compared to conditional phrases. If the verbal command includes a conditional phrase that corresponds to a request to generate a shortcut command phrase, the text can be further processed to identify (i) the portion of the text that corresponds to a trigger for the shortcut command phrase and (ii) the portion of the text that is associated with the one or more actions to be performed in response to the shortcut command phrase.

Block 310 of the method 300 can include generating a second storage entry that provides a correlation between the shortcut command phrase and the one or more actions. For instance, the second storage entry can directly or indirectly identify the phrase "I'm going for a run," and the actions of initializing a music application on a user's portable device to play the workout playlist, causing their security alarm to initialize, and causing their thermostat to be set to a lower temperature. In this way, the user is able to cause the actions to be performed without having to recite multiple different command phrases. Furthermore, this allows the automated assistant to adapt to the changing preferences of the user.

Figure 4:
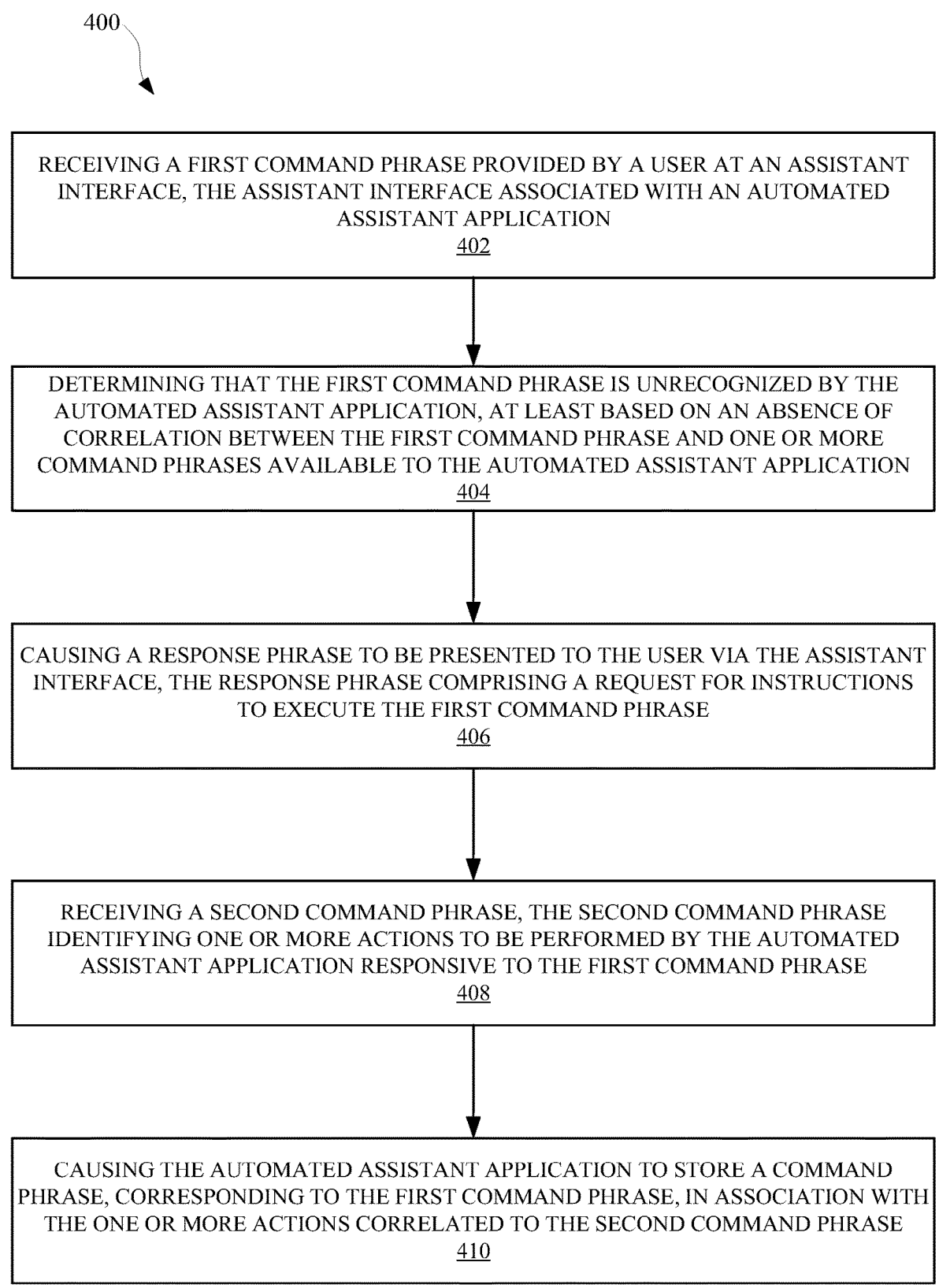
FIG. 4 illustrates a method for configuring an automated assistant to be responsive to a previously unrecognized shortcut command phrase.

FIG. 4 illustrates a method 400 for configuring an automated assistant to be responsive to a previously unrecognized shortcut command phrase. The method 400 can be performed by one or more computing devices and/or any other apparatus capable of managing settings for an automated assistant. As shown in FIG. 4, the method 400 can include a block 402 of receiving a first command phrase provided by a user at an assistant interface. The assistant interface can be associated with an automated assistant application that is accessible to the one or more processors. For instance, the assistant interface can be an application that operates at a computing device owned by the user, and the application can cause the computing device to transmit the first command phrase to the automated assistant application located at a separate computing device. The separate computing device can include a voice to text engine that can convert transmission from the computing device (e.g., audio recorded by a microphone of the computing device) to text for further processing by the automated assistant application.

The method 400 can further include a block 404 of determining that the first command phrase is unrecognized by the automated assistant application. The determination at block 804 can be based at least on an absence of correlation between the first command phrase and one or more command phrases available to the automated assistant application. The lack of correlation can be represented at a database accessible to the automated assistant application for storing a variety of different command phrases to which the automated assistant application can be responsive. The automated assistant application can access the database in response to receiving the first command phrase and determine, based on data available at the database, that the first command phrase has not previously been received by the automated assistant application and/or is not mapped, for the user, to any associated actions. For instance, the first command phrase can be "Get ready for the neighbors to come over." The automated assistant can determine that the aforementioned phrase had not previously been received by the automated assistant and/or is not mapped, for the user, to any associated actions, by comparing the first command phrase to data in the database and concluding that the first command phrase is not identified in the data.

The method 400 can further include a block 406 of causing a response phrase to be presented to the user via the assistant interface. The response phrase includes a request for instructions to execute the first command phrase. In other words, the automated assistant application can cause the computing device to provide a message (e.g., a graphical or audible message) to the user requesting that the user explain how to fulfill the first command phrase. The message can be, for example, "I don't know how to do that yet. Could you tell me how?" In this way, the user can be put on notice that the automated assistant can learn new commands, despite not initially recognizing the new commands. The user can thereafter explain to the automated assistant how to fulfill the first command phrase.

Block 408 of method 400 can include receiving a second command phrase in response to providing of the response phrase. The second command phrase can identify one or more actions to be performed by the automated assistant application in response to the first command phrase. For instance, the second command phrase can be embodied in a verbal response from the user and provided after the user receives the response phrase from the automated assistant. The second command phrase can include multiple different commands that are associated with actions the user intends to be performed in response to the user providing the first command phrase. The verbal response can include, for example, "Sure, order a pizza, play my party playlist, and vacuum the house," which includes three different commands. The first command can cause the automated assistant to order a pizza through a third party agent that the user has historically used to order pizza. The second command can cause the automated assistant to access a music application for playing the party playlist identified by the user. Finally, the third command can cause the automated assistant to interact with an internet of things (IoT) device that is connected to the internet or a local network that is accessible to the automated assistant. The IoT device can be, for example, a WiFi enabled, autonomous vacuum cleaner that typically cleans the home of the user according to set schedule, but can vacuum the home in response to commands from the user or the automated assistant.

In some implementations, the automated assistant can provide further inquiries in response to receiving the verbal response from the user. For instance, when multiple different third party agents (e.g., third party service applications) are available for fulfilling command, the automated assistant can request that the user specify the third party agent to be employed for fulfilling the command. For example, in response to receiving the second command phrase, the automated assistant can response with "Would you like me to place the pizza order with Company A or Company B?" In response, the user can specific "Company A" and the automated assistant can designate "Company A" as a slot value for a function that is employed by the automated assistant to complete the first command phrase.

The method 400 can include a block 410 of causing the automated assistant application to store a command phrase, corresponding to the first command phrase, in association with the one or more actions correlated to the second command phrase. In other words, the automated assistant application can cause a storage entry to be generated in the database, and the storage entry can provide a correlation between the first command phrase and the one or more actions. For instance, the storage entry can directly or indirectly identify the actions of ordering a pizza, playing a party playlist, and vacuuming the house, as well as the first command phrase "Get ready for the neighbors to come over." As a result, the automated assistant application has adapted to a new command phrase provided by a user, and also consolidated commands into a phrase that invokes the automated assistant to perform multiple actions.

Figure 5:
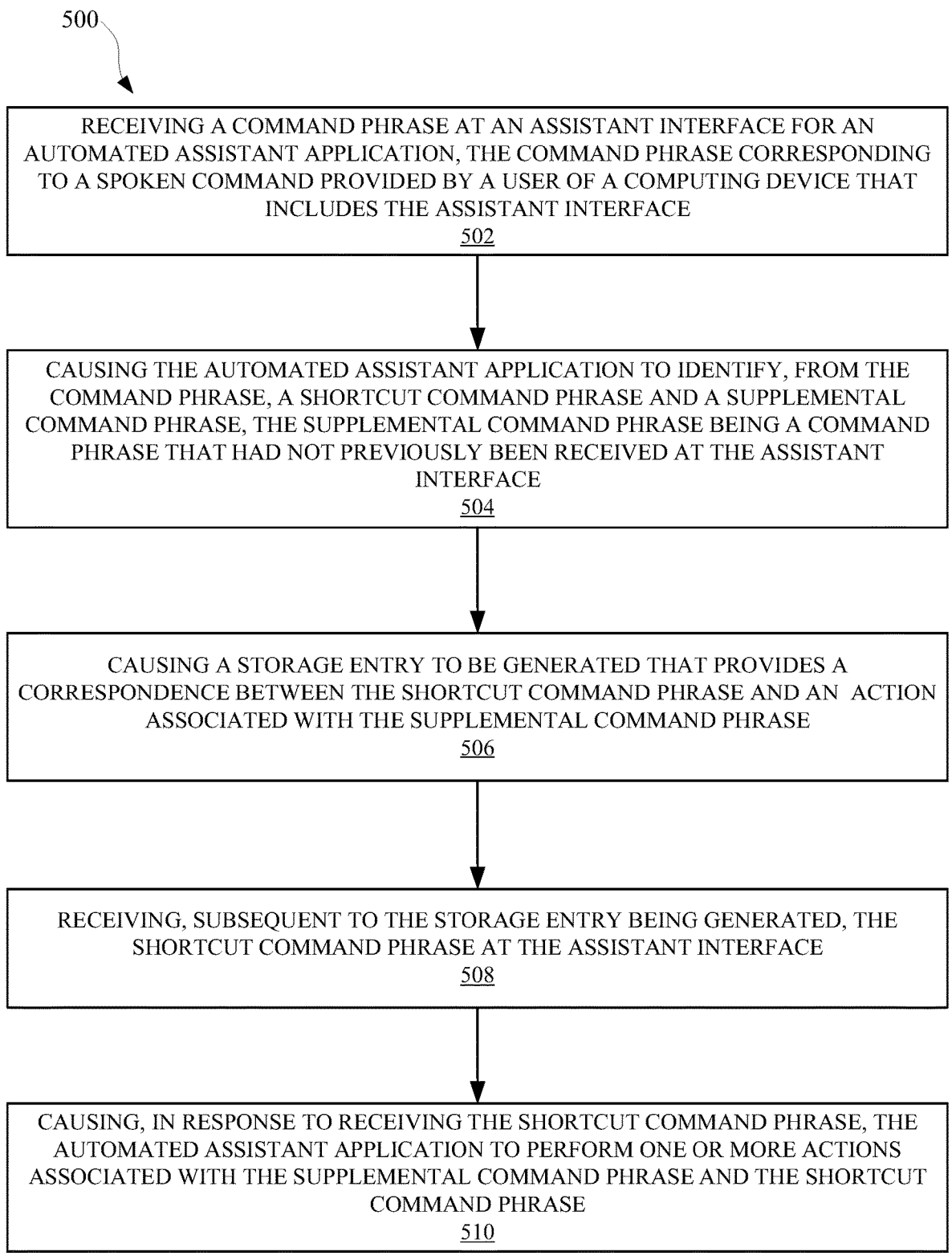
FIG. 5 illustrates a method for providing a shortcut command phrase that supplements an existing command phrase for operating an automated assistant.

FIG. 5 illustrates a method 500 for providing a shortcut command phrase that supplements an existing command phrase for operating an automated assistant. The method 500 can be performed by one or more computing devices and/or any other apparatus capable of interacting with an automated assistant application. The method 500 can include a block 502 of receiving a command phrase at an assistant interface for an automated assistant application. The command phrase can correspond to a spoken command provided by a user of a computing device that includes the assistant interface. The command phrase can include "When I say 'Order cleaning supplies,' also order paper towels." In this way, the command phrase can include instructions for amending a current shortcut command phrase to include an additional action.

The method 500 can further include a block 504 of causing the automated assistant application to identify, from the command phrase, a shortcut command phrase and a supplemental command phrase. The supplemental command phrase can be a command phrase that had not previously been received at the assistant interface. In order to identify the shortcut command phrase and the supplemental command phrase, the automated assistant can cause the spoken command to be converted from an audio recording to textual data. The textual data can thereafter be parsed and compared with a database that includes entries that identify stored command phrases and actions available to the automated assistant. For instance, the command phrase "When I say 'Order cleaning supplies,' also order paper towels" can be converted to text and parsed to identify "Order cleaning supplies" as a shortcut command phrase and "order paper towels" as the supplemental command phrase. The latter phrase can be designated as a supplemental command phrase at least based on the command phrase including the words "when I say" and "also." These words can also be compared to entries in a database for determining that the user is commanding the automated assistant to amend a currently existing shortcut command phrase (i.e., "Order cleaning supplies"). An existing shortcut command phrase can be one that causes the automated assistant to perform multiple different actions, which can otherwise be individually executed if the user provides independent command phrases.

The method 500 at block 506 can include causing a storage entry to be generated that provides a correspondence between the shortcut command phrase and an action associated with the supplemental command phrase. In other words, a database or other memory location accessible to the automated assistant can be modified to include an entry that directly or indirectly identifies both the shortcut command phrase and the action associated with the supplemental command phrase. In some implementations, the shortcut command phrase can already be correlated to a variety of different actions, and the generated storage entry can cause another action to be correlated to the shortcut command phrase. For instance, the shortcut command phrase can be correlated to the actions of "order rubber gloves," "order bathroom cleaner," and "order a scrub brush" through entries in the database. The action of ordering paper towels can be correlated to the shortcut command phrase by the generated storage entry in response to the user providing the command phrase.

The method 500 can further include a block 508 of receiving, subsequent to the storage entry being generated, the shortcut command phrase at the assistant interface. For instance, the user can provide the shortcut command phrase "Order cleaning supplies," which was previously modified to incorporate additional actions (e.g., "ordering paper towels"). Additionally, the method 500 can include a block 510 of causing, in response to receiving the shortcut command phrase, the automated assistant application to perform one or more actions associated with the supplemental command phrase and the shortcut command phrase. For instance, the automated assistant can identify an entry in the database corresponding to the shortcut command phrase. The entry can identify actions that were previously associated with the shortcut command phrase and also associated with the supplemental command phrase. Such actions can include ordering rubber gloves through a website, ordering a scrub brush through a third party agent, and/or ordering bathroom cleaner through a phone application. Additionally, as a result of the user providing the command phrase at block 502, the actions can include ordering paper towels from the phone application. By operating the automated assistant in this way, the user is able to amend previously configured shortcut command phrases to incorporate new actions and/or command phrases in order to reduce a number of interactions between the user and the automated assistant. This can save the user time, and also save computational resources at the computer that hosts the automated assistant.

Figure 6:
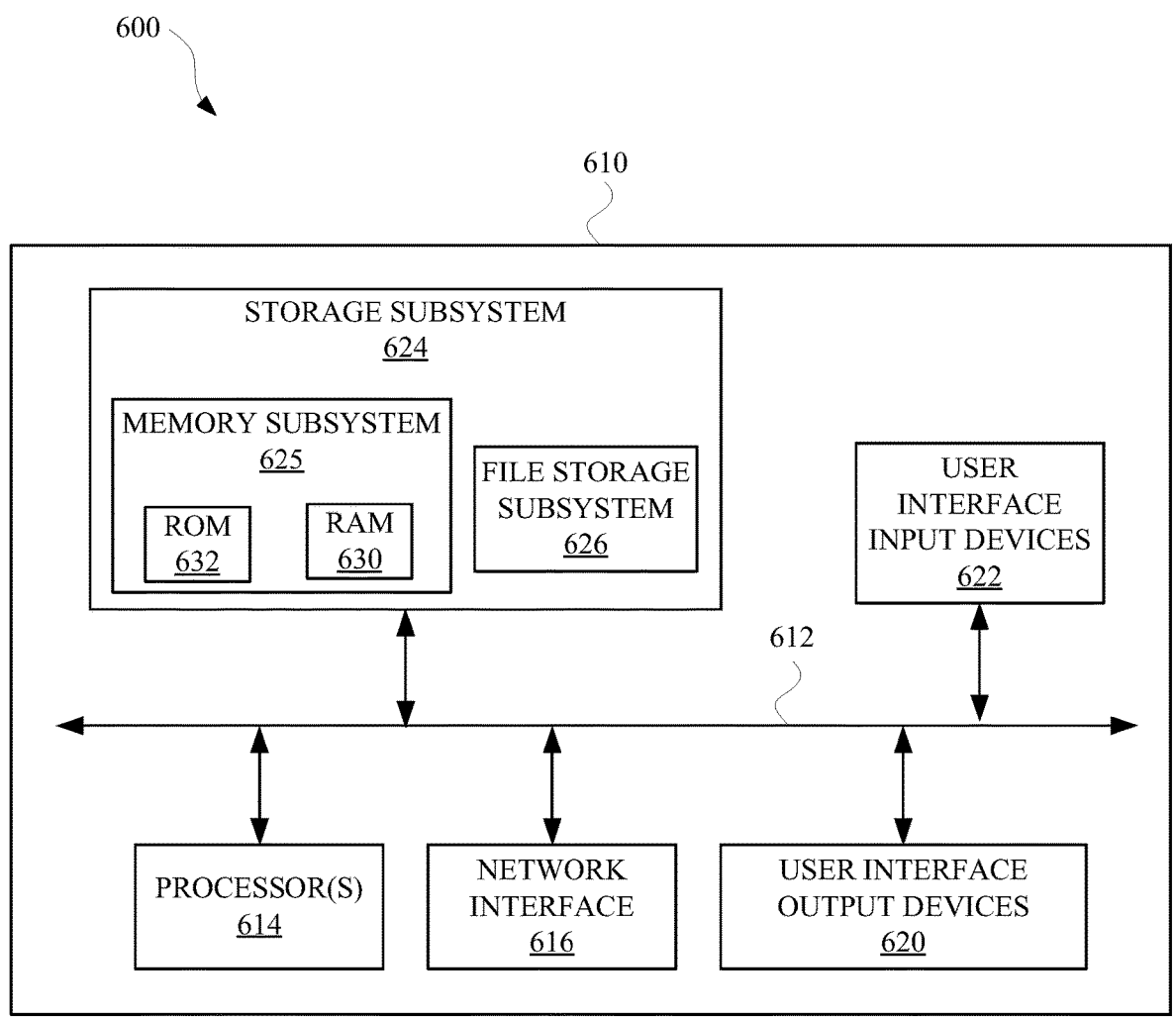
FIG. 6 is a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 300, method 400, method 500, and/or computing device 102, computing device 206, server device 112, remote devices, and/or any other device or apparatus discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
  receiving multiple command phrases at an automated assistant interface of a computing device,
    wherein the multiple command phrases are processed, as input data, by an automated assistant application that is accessible to the computing device;
  identifying, using the input data, multiple actions to be performed by the automated assistant application,
    wherein the automated assistant application performs a particular action of the multiple actions, in dependence on a first slot of the action and a second slot of the action, and wherein the multiple command phrases fail to specify any value for the first slot and fail to specify any value for the second slot, and
    wherein performing the particular action or an additional action of the multiple actions causes a state of an Internet of Things (IOT) device that is connected to the internet to be altered, and wherein the IOT device is in addition to the computing device;
  receiving a spoken utterance that identifies a shortcut command phrase,
    wherein the spoken utterance is received at the automated assistant interface,
    wherein the shortcut command phrase corresponds to a request to cause the multiple actions to be performed by the automated assistant application in response to the user subsequently providing the shortcut command phrase as input to the automated assistant interface, and
    wherein the shortcut command phrase is shorter relative to configurations of the multiple command phrases that would otherwise trigger performance of the multiple actions;
  causing, based on receiving the spoken utterance that identifies the shortcut command phrase and based on determining that the multiple command phrases fail to specify any value for the first slot and fail to specify any value for the second slot, a prompt to be provided from the automated assistant application, the prompt comprising an additional request for slot values for the first slot of the particular action and for the second slot of the particular action;
  receiving, in response to the prompt being provided from the automated assistant application, a user input that identifies a first slot value for the first slot of the particular action and that requests future inquiring for the second slot of the particular action;
  generating, based on the user input and the shortcut command phrase, a storage entry that provides a correlation between the shortcut command phrase, the first slot value, and the multiple actions; and
  subsequent to generating the storage entry:
    receiving the shortcut command phrase at the automated assistant interface of the computing device; and
    in response to receiving the shortcut command phrase, and based on the storage entry:
      performing, by the automated assistant application, the multiple actions including the particular action, wherein the particular action is performed using:
        the first slot value, of the storage entry and for the first slot, that was identified based on the user input, and
        a second slot value, for the second slot that is generated based on further user input that is received responsive to a further prompt that is provided by the automated assistant application in response to receiving the shortcut command phrase.

2. The method of claim 1, wherein the multiple command phrases are different from the first slot value.

3. The method of claim 1, wherein at least one command phrase of the multiple command phrases causes the automated assistant application to transmit an agent command to a separate computing device, wherein the agent command includes the first slot value and the second slot value.

4. The method of claim 1, wherein identifying the multiple command phrases includes comparing the input data to command phrase entries accessible to the automated assistant application to determine whether a portion of the input data is identified in the command phrase entries.

5. The method of claim 1, wherein receiving the shortcut command phrase includes receiving multiple shortcut command phrases, and the method further comprises:
  identifying a total number of shortcut command phrases in the multiple shortcut command phrases; and
  comparing the total number of shortcut command phrases to a shortcut threshold.

6. The method of claim 5, further comprising:
  when the total number of shortcut command phrases is outside of the shortcut threshold, causing the automated assistant application to indicate that the total number of shortcut command phrases exceeds the shortcut threshold.

7. The method of claim 1, wherein the IOT device is a smart lightbulb, and wherein performing the action or the additional action of the multiple actions causes a state of the smart lightbulb to be altered.

8. The method of claim 1, wherein the first slot value is a particular time of a plurality of candidate times that can be specified for the first slot of the action.

9. The method of claim 1, wherein the first slot value is a particular quantity of a plurality of candidate quantities that can be specified for the first slot of the action.

10. A system, comprising:
  one or more processors; and
  memory configured to store instructions that, when executed by the one or more processors, cause the one or more processors to perform steps that include:
    receiving a first spoken command phrase provided by a user at an assistant interface, the assistant interface associated with an automated assistant application that is accessible to the one or more processors;
    determining whether the first spoken command phrase is unrecognized by the automated assistant application, at least based on whether there is an absence of correlation between the first spoken command phrase and one or more spoken command phrases available to the automated assistant application; and
    when the first spoken command phrase is unrecognized by the automated assistant application:
      causing a response phrase to be presented to the user via the assistant interface, the response phrase comprising a request for instructions for responding to the first spoken command phrase;
      receiving one or more second spoken command phrases in response to providing of the response phrase,
        wherein the one or more second spoken command phrases identify multiple actions to be performed by the automated assistant application responsive to the first spoken command phrase, wherein the automated assistant is pre-configured to perform at least one of the multiple actions responsive to each of the one or more second command phrases;

determining that the one or more second spoken command phrases fail to specify any value for a first slot of a particular action, of the multiple actions, and fail to specify any value for a second slot of the particular action;

in response to determining that the one or more second spoken command phrases fail to specify any value for the first slot of the particular action and fail to specify any value for the second slot of the particular action:

causing a prompt to be provided, via the assistant interface, that requests specifying of the first slot and of the second slot;

determining that a response, to the prompt, that is received via the assistant interface:

specifies a first slot value for the first slot for the particular action, and requests future inquiring for the second slot of the particular action; and causing the automated assistant application to store a command phrase, corresponding to the first spoken command phrase, in association with the multiple actions identified in the one or more second spoken command phrases, including storing the command phrase in association with the particular action and the first slot value for the first slot of the particular action, wherein the command phrase is different than the one or more second command phrases.

11. The system of claim 10, wherein the steps further include:

subsequent to causing the automated assistant application to store the first spoken command phrase, in association with the multiple actions identified in the one or more second spoken command phrases:

receiving, at the assistant interface or an additional assistant interface, input that corresponds to the first spoken command phrase;

in response to receiving the input that corresponds to the command phrase, and based on the command phrase being stored in association with the multiple actions:

causing the multiple actions to be performed by the automated assistant application, wherein causing the multiple actions to be performed by the automated assistant application comprises causing, based on the command phrase being stored in association with the particular action and the first slot value for the first slot of the particular action, the particular action to be performed with the first slot value for the first slot of the particular action and with a second slot value, for the second slot of the particular action, that is solicited in response to receiving the input that corresponds to the command phrase.

12. The system of claim 11, wherein an action of the multiple actions includes invoking a third party agent application, that is hosted at a separate computing device, through transmission of an invocation request to the third party agent application.

13. The system of claim 10, wherein the steps further include:

receiving a third command phrase at the assistant interface, wherein the third command phrase is a spoken command that corresponds to the first spoken command phrase.

14. The system of claim 13, wherein the steps further include:

causing the third command phrase to be converted to input data that is parsed by a speech processing application; and determining, from the input data, that the first command phrase is identified in content of the third command phrase.

15. The system of claim 11, wherein the multiple actions include transmitting a control signal to a peripheral device that is accessible to the one or more processors.

16. A method implemented by one or more processors, the method comprising:

receiving one or more spoken utterances at an automated assistant interface of an automated assistant application of a computing device;

processing the one or more spoken utterances to determine that the one or more spoken utterances include a shortcut command phrase, a first command phrase, a second command phrase, and a request to associate the shortcut command phrase with the first command phrase and the second command phrase;

determining that the first command phrase corresponds to a first action;

determining that the second command phrase corresponds to a second action;

determining that the one or more spoken utterances fail to specify any value for a first slot, of the second action, that is used in performing the second action and fail to specify any value for a second slot, of the second action, that is used in performing the second action;

in response to determining that the one or more spoken utterances: (i) include the request to associate the shortcut command phrase with the first command phrase and the second command phrase, and (ii) fail to specify any value for the first slot of the second action and fail to specify any value of the second slot of the second action:

causing a prompt to be provided, from the automated assistant application, that requests specifying of the first slot and the second slot of the second action;

receiving, in response to the prompt being provided from the automated assistant application, a user input that identifies a first slot value for the first slot of the second action, but request future inquiring for the second slot of the second action;

generating a storage entry that provides a correlation of the shortcut command phrase to the first action and to the second action, wherein the correlation to the second action includes a correlation to the first slot value, for the first slot of the second action, responsive to receiving the user input that identifies the first slot value; and subsequent to generating the storage entry:

receiving the shortcut command phrase at the automated assistant interface of the computing device; and in response to receiving the shortcut command phrase, and based on the correlation of the storage entry:

performing, by the automated assistant application, the first action and the second action, wherein the second action is performed using the first slot value, for the first slot of the second action, and a second slot value, for the second slot of the second action, that is generated based on further user input received responsive to a further prompt that is provided by the automated assistant application in response to receiving the shortcut command phrase.

* * * * *